United States Patent [19]
Fukuda et al.

[11] Patent Number: 5,231,870
[45] Date of Patent: Aug. 3, 1993

[54] VEHICLE COMPOSITE TEST APPARATUS

[75] Inventors: Yutaka Fukuda, Tokorozawa; Yukio Higuchi, Fuji; Yukihiro Imoto, Sakado; Noriyoshi Nakano, Yokohama, all of Japan

[73] Assignee: Anzen Motor Co., Ltd., Tokyo, Japan

[21] Appl. No.: 870,909

[22] Filed: Apr. 20, 1992

Related U.S. Application Data

[62] Division of Ser. No. 804,367, Dec. 10, 1991, Pat. No. 5,131,267, which is a division of Ser. No. 450,304, Dec. 14, 1989, Pat. No. 5,088,320.

[30] Foreign Application Priority Data

| Dec. 14, 1988 | [JP] | Japan | 63-161294 |
| Dec. 14, 1988 | [JP] | Japan | 63-161295 |
| Dec. 14, 1988 | [JP] | Japan | 63-161296 |
| Dec. 14, 1988 | [JP] | Japan | 63-313849 |

[51] Int. Cl.$^5$ ............................................. G01M 19/00
[52] U.S. Cl. .................................................... 73/117
[58] Field of Search .................. 73/117, 123–127; 33/203.13, 203.18, 203.19, 203.2; 188/60, 31, 69

[56] References Cited

U.S. PATENT DOCUMENTS

| 1,424,633 | 8/1922 | Fial | 188/31 |
| 2,781,659 | 2/1957 | Parker, Jr. | 73/117 |
| 2,967,591 | 1/1961 | Blount | 188/69 |
| 3,200,907 | 8/1965 | Hansen | 188/31 |
| 4,084,663 | 4/1978 | Haley | 188/31 |
| 4,901,560 | 2/1990 | Hirano et al. | 73/117 |

FOREIGN PATENT DOCUMENTS

823372 11/1959 United Kingdom .................. 188/31

Primary Examiner—Robert Raevis
Attorney, Agent, or Firm—Foley & Lardner

[57] ABSTRACT

The invention relates to a vehicle composite test apparatus in which various tests of a vehicle are carried out with the tires placed or fixed on support bases and serving as means to be detected or measured. In particular, the invention provides a vehicle composite test apparatus in which the vehicle center line Lc and the measurement reference line Ls can be easily and automatically aligned. In order to further enhance the operation of the apparatus, the invention also provides a parallel moving mechanism constituted such that a pair of moving platforms onto which the vehicle may be advanced, can be smoothly moved in parallel with precision, a tire guide apparatus for guiding tires precisely to desired tire measurement positions on said test apparatus, and a lock mechanism capable of easily and positively locking a pair of active juxtaposed rollers arranged at the tire measurement positions against rotation.

3 Claims, 11 Drawing Sheets

VEHICLE COMPOSITE TEST APPARATUS

CROSS REFERENCE TO RELATED APPLICATION

This application is a division of co-pending application Ser. No. 07/804,367 filed Dec. 10, 1991 now U.S. Pat. No. 5,131,267, which in turn is a division of our co-pending application Ser. No. 07/450,304 filed Dec. 14, 1989, now U.S. Pat. No. 5,088,320.

FIELD OF THE INVENTION

The present invention relates to a vehicle composite test apparatus wherein various tests of a vehicle are carried out with the tires placed or fixed on support bases by detecting the positions of e wheels, and particularly to a vehicle composite test apparatus wherein a pair of support bases positioned on the front wheel side and a pair of support bases positioned on the rear wheel side can be moved symmetrically in the transfers direction toward or away from a measurement reference line.

BACKGROUND OF THE INVENTION

Vehicle composite test apparatuses are conventionally known wherein, using tires of a vehicle as means to be detected, in addition to basic test items such as the braking, and speed, various positional displacements of wheels such as the toe, camber, caster, and king pin angles that improve the maneuvering stability of the vehicle as well as various test times such as the measurement of light distribution of head lights, and tail lights that will be carried out on the basis of the vehicle center line between the tires can be measured at tire setting positions provided on support bases.

Figure 4:
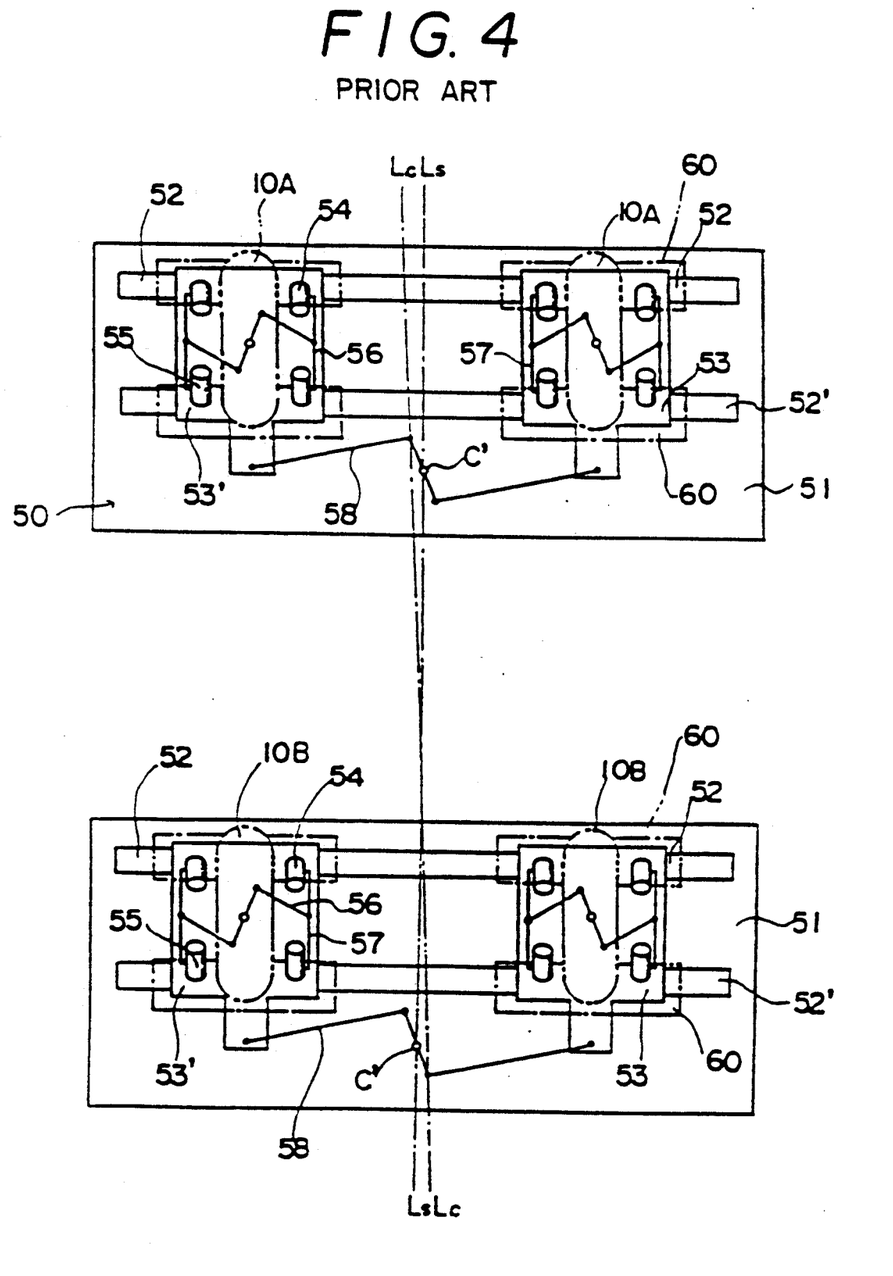
FIG. 4 is a schematic view showing a prior vehicle composite test apparatus.

In this type of test apparatus, a rear wheel measuring section A and a front wheel measuring section B that are constituted independently as shown in FIG. 4 are arranged to correspond to the wheel bases of a vehicle, the front wheels and the rear wheels are placed respectively on support bases 53, 53' positioned on the right and left sides of the measuring sections A, B, and thereby the various tests mentioned above are carried out.

The constitution of the measuring sections A, B is such that a pair of rails 52, 52' are placed on rectangular fixed bases 51 extending in the direction of the width of the vehicle, and are arranged in parallel along the direction (hereinafter referred to as the direction of the width of the vehicle) orthogonally to the measurement reference line Ls corresponding to the central line extending along the direction of travel of the vehicle, the pairs of support bases 53, 53' are arranged on the opposite sides of the measurement reference line Ls, positioning means 56 for positioning wheels 10 with the opposite sides of the wheels 10 clamped by a plurality of rollers 54, 55 provided on the support bases 53, 53' are swingably supported on the support bases 53, 53' through support shafts, and said pairs of support bases 53, 53' are connected movably toward or away from one another by link-like connecting mechanisms, called "equalizers", 58 having fixed rotation supporting points C, C' on the measurement reference line Ls called.

The wheels on the side of the front wheels 10A and on the side of the rear wheels 10B are positioned on the support bases 53, 53' by the positioning means 56. Then following the positioning operation, the connecting mechanisms 58 move the pairs of support bases 53, 53' symmetrically toward or away from the fixed rotation supporting points C, C' thereby aligning the measurement reference line Ls connecting the fixed rotation supporting points C, C' with the vehicle center line Lc. Due to this alignment the above-mentioned various test items that are tested with the wheels 10 of the vehicle being means to be detected can be tested accurately.

However, in such apparatus, since the line C—C' connecting the fixed rotation supporting points and the rails 52, 52 are integrally attached respectively on the fixed bases 50, 51 on the side of the front wheels 10A and on the side of the rear wheels 10B, the direction of movement of the pairs of support bases 53, 53' movably attached to the rails is restricted.

On the other hand, vehicles include, for example, attaching position errors of front wheels 10A and rear wheels 10B due to various production conditions, and cannot be produced with the attaching positions of wheels of the vehicles being very precise. Therefore if, the wheels of a vehicle having attachment position errors are clamped forcibly on the support bases 53, 53' whose positions are restricted approximately to the shape of the letter H by the rails 52, 52' and the line C—C' connecting the rotation supporting points, the vehicle center line Lc and the measurement reference line Ls may come out of alignment in some cases, and accurate measurement becomes impossible.

Further, in the above prior technique, to place tires in the prescribed central positions of the support bases 53, 53', it is necessary that the intervals between the support bases 53, 53' on the side of the front wheels 10A and on the side of the rear wheels 10B are moved by equalizers toward or away from one another to correspond to the width of the vehicles to be tested. The widths of vehicles are not necessarily uniform due to scattering during production even if the vehicles are of the same type, and in practice it is quite difficult to move the support bases 53, 53' toward or away from one another to correspond to the intervals between the wheels of the individual vehicles to be tested.

Further if the vehicle is placed on the support bases 53, 53' with the vehicle dislocated to one side, or is introduced obliquely by mistake, if the wheels are clamped forcibly even by the positioning means 56, the vehicle center line Lc and the measurement reference line Ls are out of alignment in some cases, and therefore accurate measurement becomes impossible.

SUMMARY OF THE INVENTION

The object of the present invention is to provide a vehicle composite test apparatus wherein the vehicle center line Lc and the measurement reference line Ls can easily and automatically be aligned in any of the case when vehicles having different widths are to be tested, the case when vehicles having attaching position errors or the like between the left and right wheels, and the case when the vehicle is dislocated to one side, or is introduced obliquely.

Another object of the present invention is to provide a parallel moving mechanism that can move long moving platforms in parallel precisely and smoothly that are to be incorporated in a vehicle composite test apparatus, etc., particularly to provide a parallel moving mechanism for long moving platforms that can easily move the long moving platforms in parallel along beams even when a force is applied in the direction of the width of the vehicle from one side of the moving platform, and when rollers that travel on the beams are loosened themselves or have, for example, sliding resistance.

In a preferred embodiment the invention further comprises a tire guide apparatus wherein in order to introduce tires to the tire setting positions of the above test apparatus with good precision, pairs of rollers are arranged along the direction of the advance of the tires with the rollers converging toward the front, and the vehicle center is aligned with the center of the roller pairs while the tires are moved onto the paris of the rollers, particularly to provide a tire guide apparatus that can easily and precisely guide and control various tires of vehicles ranging from small vehicles to large vehicles to the center positions of roller pairs without increasing the diameter of the rollers.

Another preferred embodiment further comprises a lock mechanism for a pair of active juxtaposed rollers used in a vehicle test apparatus that enables the rollers to be locked positively even if gears concentrically fixed to the rollers are rotated with the phases shifted.

BRIEF DESCRIPTION OF THE DRAWINGS

The invention is described in further detail hereinafter with reference to the accompanying drawings wherein:

FIGS. 1 to 3 show a vehicle composite test apparatus of an embodiment of the present first invention.

FIGS. 5 to 7 show a parallel moving mechanism for moving platforms of a second embodiment of the present.

FIGS. 8 to 10 show a guide apparatus of an embodiment of the present invention; FIGS. 9 (a) and (b) are a left side (outside) view thereof and a right side (inside) view thereof.

FIGS. 12 to 14 show an active juxtaposed roller pair of an embodiment of the present invention; FIGS. 13 (A) and (B) cross sectional views taken along line C—C' of FIG. 12, showing the locked state and the unlocked state respectively.

DETAILED DESCRIPTION

Figure 1:
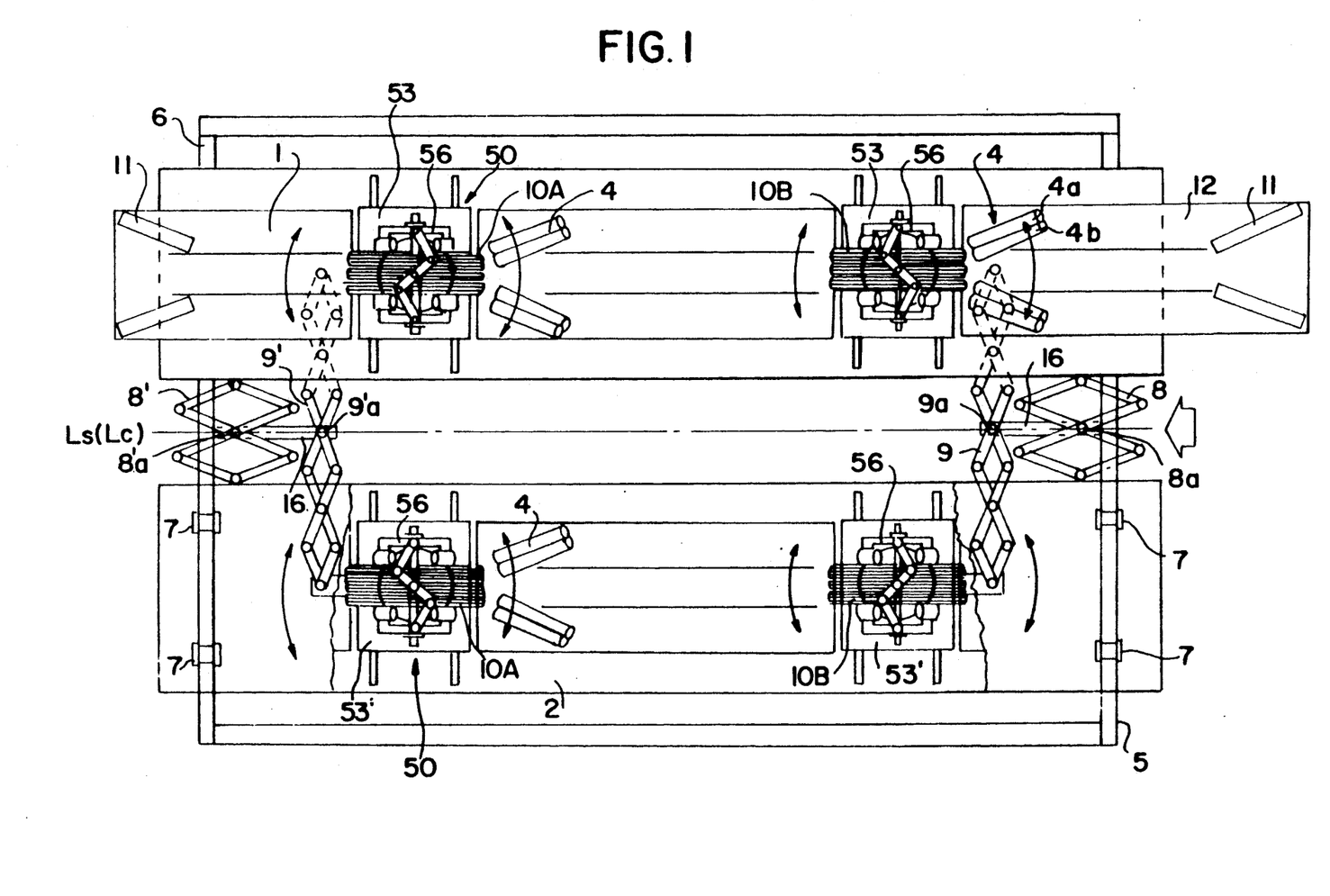
FIG. 1 is a schematic plan view thereof.
Figure 2:
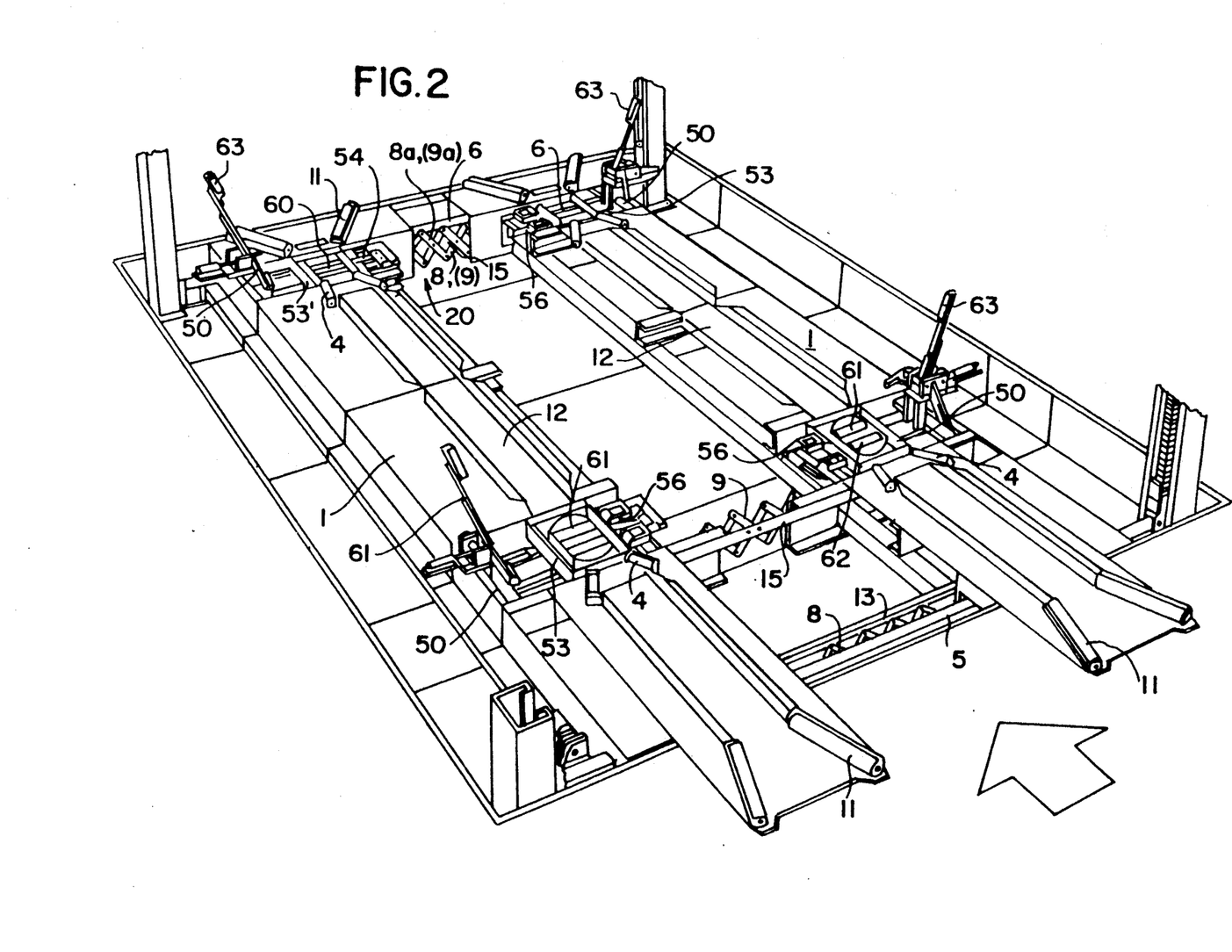
FIG. 2 is a detail perspective view thereof.
Figure 3:
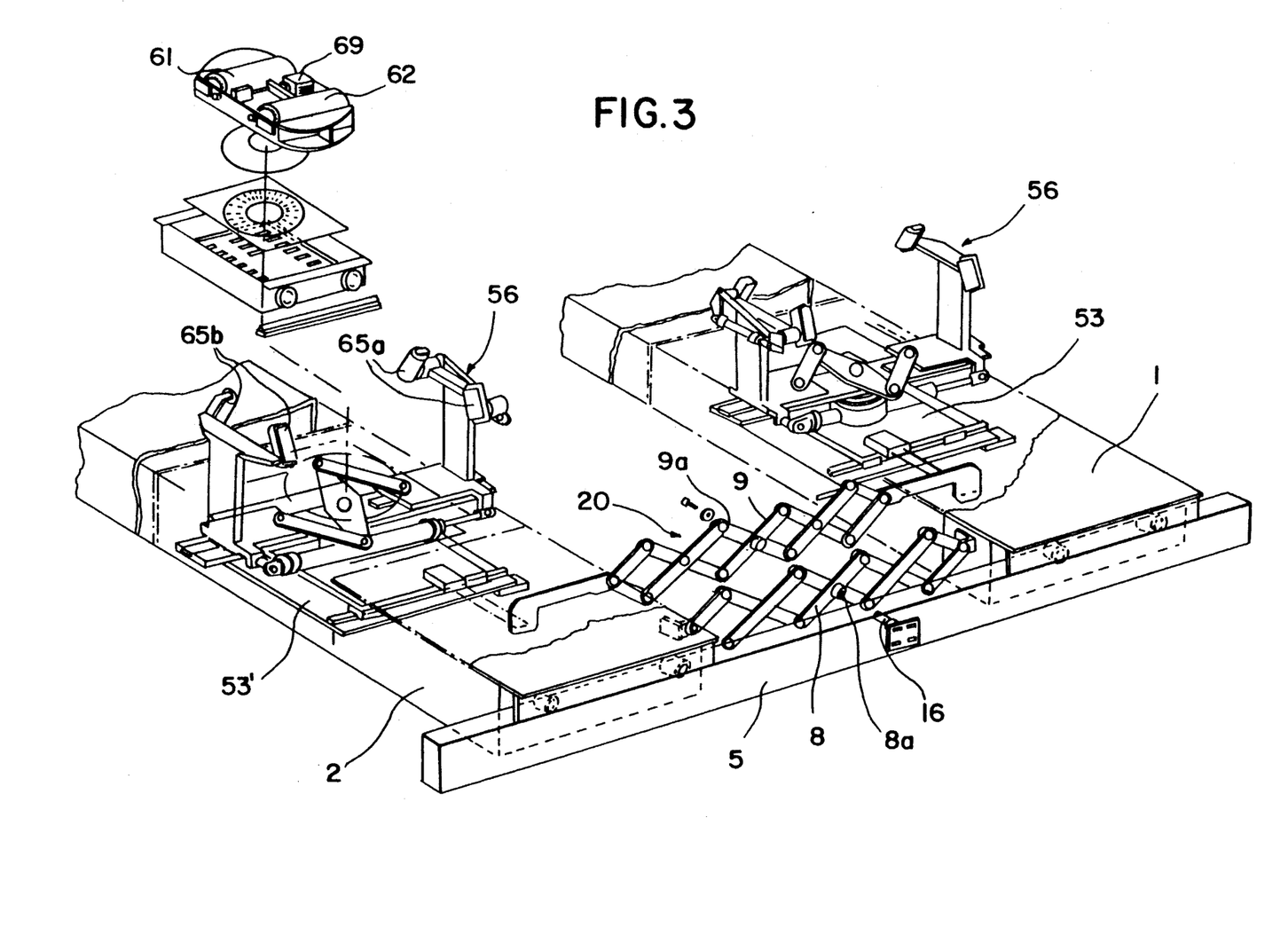
FIG. 3 is a schematic view of essential parts thereof.

As shown in FIGS. 1 to 3, a feature of the present invention lies in that pairs of support bases 53, 53' on the side of front wheels and on the side of rear wheels are not integrated onto fixed bases through rails as in the above prior technique, but a pair of moving platforms 1, 2 arranged in parallel on the opposite sides of the measurement reference line Ls are prepared, the support bases 53, 53' on the side of left wheels and on the side of right wheels are attached to prescribed positions preferably corresponding to the wheel bases on the moving platforms 1, 2. The support bases 53, 53' attached onto the moving platforms 1, 2 are connected through pantograph-like moving mechanisms 9, 9', and the support bases 53, 53' can be moved symmetrically in the direction of the width of a vehicle toward or away from supporting points 9a positioned approximately on the measurement reference line Ls.

A second feature lies in that the pair of moving platforms 1, 2 can also be moved in the direction of the width of the vehicle, and are also connected through pantograph-like moving mechanisms 8, 8' so that the moving platforms 1, 2 can be moved in the direction of the width of a vehicle symmetrically toward or away from supporting points 8a located at positions similar to supporting points 9a.

The third feature of the invention lies in that at least one pair of guide rollers 4 are provided on each of the moving platforms 1, 2 on the inlet side of the support bases 53, 53' with the guide rollers converging toward the support bases 53, 53', and the moving platforms 1, 2 can be moved by the force applied to the moving platforms 1, 2 through the guide rollers 4 toward or away from one another correspondingly to the width of the vehicle to be tested when the vehicle is advanced.

According to the above arrangement, since the moving platforms 1, 2 capable being moved symmetrically toward or away from the measurement reference line Ls are provided, by moving the moving platforms 1, 2 themselves toward or away from one another correspondingly to the vehicle coming onto the moving platforms 1, 2, particularly by moving the moving platforms 1, 2 by means of the force applied to the moving platforms 1, 2 through the guide rollers 4 toward or away from one another correspondingly to the width of the vehicle to be tested when the vehicle is advanced, the vehicle center line Lc and the measurement reference line Ls can be aligned easily and automatically, particularly, even if the vehicle is introduced with the vehicle displaced to one side, or is introduced obliquely.

Further, since the support bases 53, 53' on which the above tests will be carried out are movably mounted on the moving platforms 1, 2 toward or away from one another via substantially common supporting points 8a, 9a, by arranging the support bases 53, 53' respectively for front wheels and rear wheels immediately after the outlets of the guide rollers 4, tires can be placed on the support bases 53, 53' by the guide rollers 4 with the center line Lc and the measurement reference line Ls aligned, so that tests which use the tires 10 as means to be detected can be carried out accurately even for vehicles differing in width, or having, for example, attaching position errors between the left and right wheels.

Each of the moving mechanisms 8, 9 is composed of a double pantograph mechanism whose supporting points 8a, 9a are substantially coincident, and it is preferable that by using the pantographs, the support bases 53, 53' are connected and the pair of moving platforms 1, 2 are connected. Thus, the alignment of the center (the measurement reference line Ls) of the moving platforms 1, 2 with the vehicle center line Lc is facilitated, and the measurement of the alignment and toe can be carried out more accurately.

Figure 5:
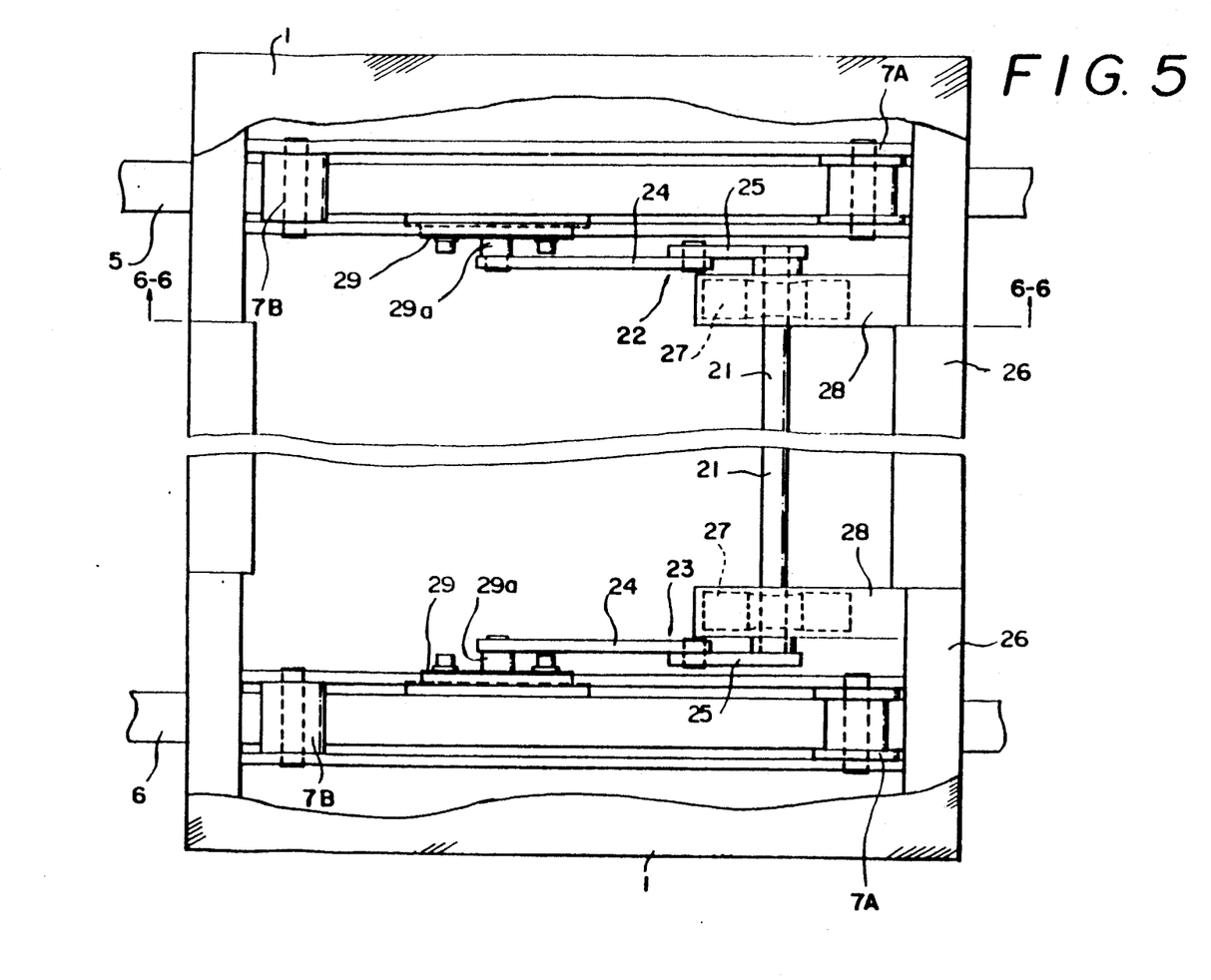
FIG. 5 is a plan view of essential parts showing the parallel moving mechanism.
Figure 6:
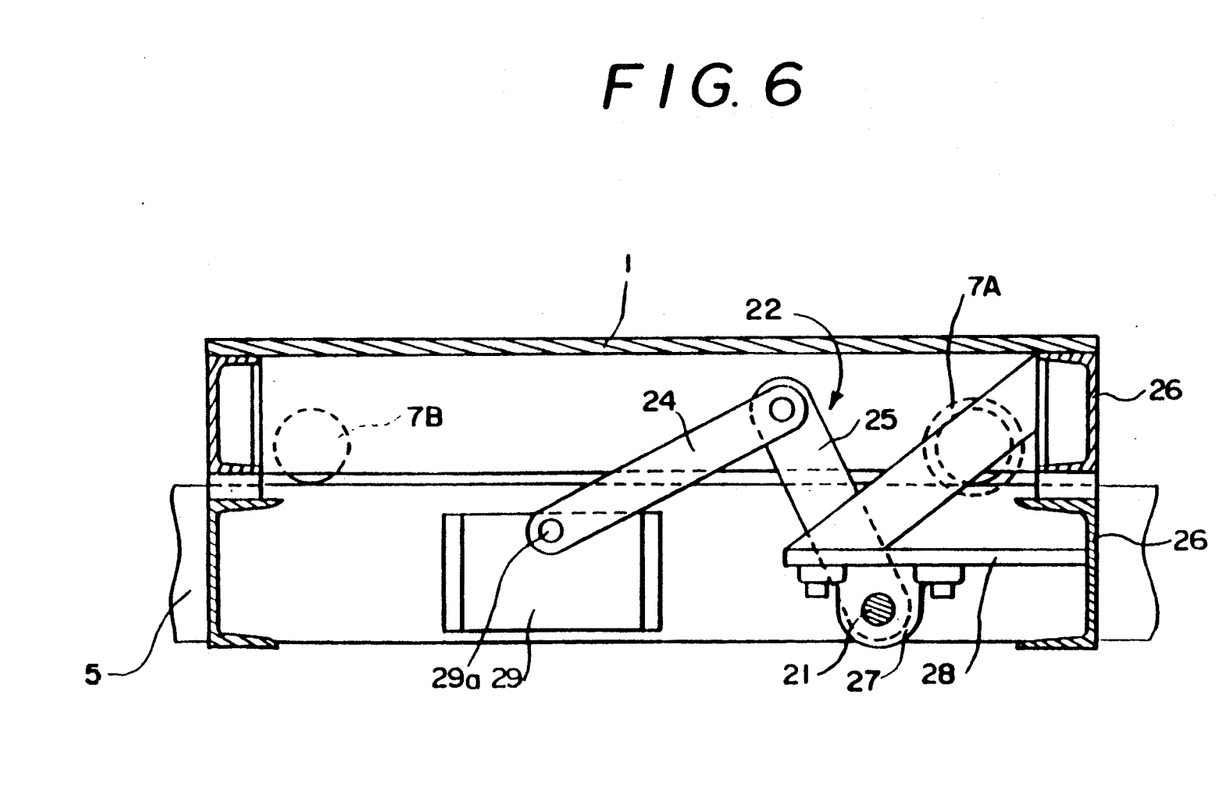
FIG. 6 is a cross sectional view taken along line 6—6' thereof.

According to the above apparatus, while the position of the vehicle introduced along the approach paths provided on the moving platforms 1, 2 is controlled by forwardly converging paris of guide rollers 11, the moving platforms 1, 2 are moved in parallel symmetrically toward or away from the measurement reference line Ls substantially correspondingly to the width of the vehicle. Thereafter the left and right wheels 10 are introduced onto the support bases 53, 53'. Therefore, since the support bases 53, 53' on the side of the front wheels 10A, and the on the side of the rear wheels 10B are also moved symmetrically toward or away from one another by clamping the wheels 10 by the positioning means 56, for example any errors in the attaching position of the front wheels 10A and the rear wheels 10B are compensated for so that the measurement of the wheel alignment can be accurate. But in order to attain the above operation smoothly, it is necessary to assume that the moving platforms 1, 2 are moved along the beams 5, 6 in parallel. Since the moving platforms 1, 2 are long, and since for example the rollers 7A, 7B on which the beams 5, 6 travel may be loosened themselves or have sliding resistance, and since the vehicle approaches from one side of the moving platforms 1, 2, the force applied to the moving platforms 1, 2 in the direction of the width of the vehicle will be applied predominantly at the end of the beam 5, and therefore it is substantially impossible to move the moving platforms 1, 2 in parallel on the beams smoothly only by the rollers 7A, 7B, so that the above techniques have been very difficult to be used in practice. Therefore, in the present invention, as shown in FIGS. 5 and 6, a parallel moving mechanism for the long moving bodies 1, 2 is disclosed in which operation transferring shafts 21 extending along the longitudinal direction of the moving bodies 1, 2 and supported rotatably on the moving platforms 1, 2 are provided, and in which a plurality of link bodies 22, 23 are arranged along the longitudinal surfaces of the beams, and one side of each of the link bodies 22, 23 is fixed to each of the operation transferring shafts 21 and the other side is pivotally supported on the beam.

Next, the operation of the above arrangement will be described with reference to FIG. 5.

1. When a pressing force is applied from one side of the moving platforms 1, 2 longitudinally of one beam 5, following the movement of the moving platforms 1, 2, the link mechanism 22 pivotally supported on the beam 5 is folded or extended.

2. The folding or extending forceably rotates the operation transferring shaft 21 fixed to one end of the link mechanism 22.

3. Due to the rotation of the operation transferring shaft 21, the link mechanism 23 pivotally supported on the other beam 6 is folded or extended.

4. The folding or extension of that link mechanism 23 applies a pressing force to the side of the moving platforms 1, 2 longitudinally of the other beam 6.

5. As a result, if a pressing force is applied on one side, the pressing force is applied to the moving platforms 1, 2 at two points near the beams 5, 6 positioned on the front and rear sides, and therefore for example even if the rollers 7A, 7B that travel on the beams are loosened themselves or have sliding resistance, the long moving platforms 2 can be moved in parallel precisely and smoothly.

Therefore, according to the present invention, even if a force is applied in the direction of the width of the vehicle from one side of the moving body, and for example the rollers that travel along the beams are loosened themselves or have sliding resistance, the long moving bodies can be easily moved in parallel along the beams, and particularly it is quite suitable as a parallel moving mechanism for long moving bodies that will be incorporated into a vehicle composite test machine wherein long moving bodies are moved in parallel when a vehicle approaches from one side as described above.

In the case of the embodiment described above, although the link mechanisms 22, 23 each are composed of a pair of pivotally supported arms 24, 25, the present invention is not limited to such an arrangement.

Figure 11:
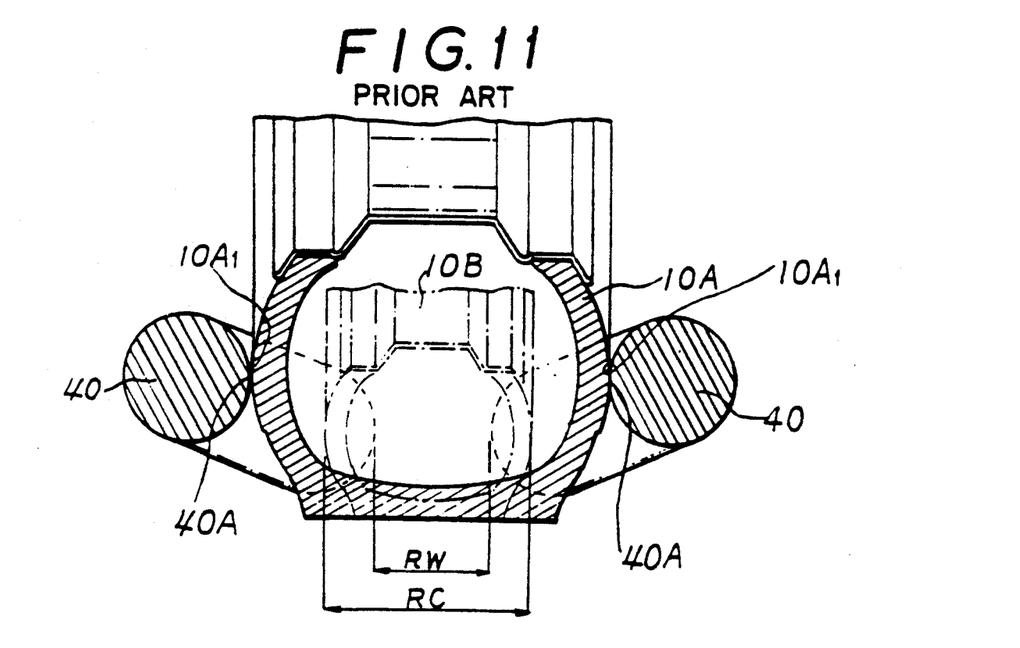
FIG. 11 is a front sectional view of a prior guide apparatus.

In the test apparatus of the present invention, a guide apparatus is provided comprising pairs of forwardly converging rollers which are arranged on approach paths positioned on the inlet side of the test apparatus along the approach direction. While a vehicle is being mounted onto the pairs of rollers through the tires, the vehicle is guided and controlled with the vehicle being moved to the center position of the rollers, and the vehicle is placed on the tire setting positions 60 on the test base, more particularly on active juxtaposed roller pairs. On the other hand, in the conventional tire guide apparatus as shown in FIG. 11, pairs of forwardly converging guide rollers 40 are arranged along the direction of the approach of tires to allow the movement and control toward the center positions. But in the conventional test apparatus, since various vehicles differing in their type of tires 10A, 10B ranging from small vehicles to large vehicles are tested, correspondingly it is required that the guide apparatus 40 can guide and smoothly control the tires 10A, 10B of any of small vehicles and large vehicles. But since the width of the tires 10A, 10B varies from 125 mm to 245 mm, a difference of almost double, it is difficult to provide a guide and control arrangement which can easily adapt to such a difference.

That is, since the guide apparatus 40 guides and control the tires 10A, 10B because the curved surfaces of opposed rollers are used to press one of the curved surfaces against the tire side surface, it is necessary to shape the rollers in such a manner that, as shown in FIG. 11, the distance between the side surfaces of rollers on the inlet side is greater than the width of the tires 10A, 10B to facilitate the approach of the tires 10A, 10B between the rollers, and to engage the tires 10A, 10B against the curved surfaces of the opposed rollers in order to facilitate the movement of the tires 10A, 10B to the center positions at the outlet side of the rollers. Therefore it is preferable that at least the central interval RC of the rollers near the inlet side is larger than the width of the tire 10A of a large vehicle, and that the roller side surface interval RW near the outlet side is smaller than the width of the tire 10B of a small vehicle.

However, to provide a guide apparatus 1 satisfying these conditions, since it is required that the above "roller center interval—roller side surface interval", in other words, the roller diameter, be equal to or larger than the difference between the above tire widths W1, W2 to be used (specifically 245 to 125 mm = 120 $\phi$), the roller diameter necessarily becomes large. As a result if the above guide and control is effected by using large diameter rollers 40, circular top sections 40A of the roller circumferential surfaces will be pressed against the weakest parts of the tire side wall surface 10A1, and consequently the side wall surfaces of the tire 10A, 10B may be scarred or damaged in some cases.

In addition, when the roller diameter is made large as described above, in the case of the tire 10B having a small diameter for small vehicles, the circular top sections of the roller circumferential surfaces will abut against a wheel, etc., and therefore precise guide and control cannot be carried out necessarily.

Figure 8:
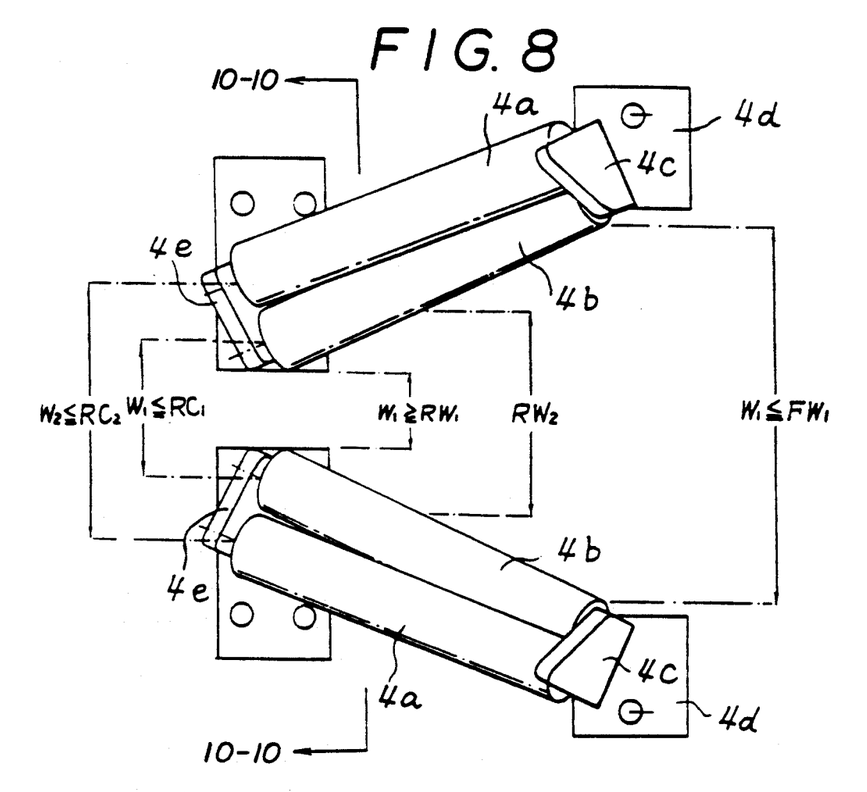
FIG. 8 is a plan view thereof.
Figures 9A, 9B:
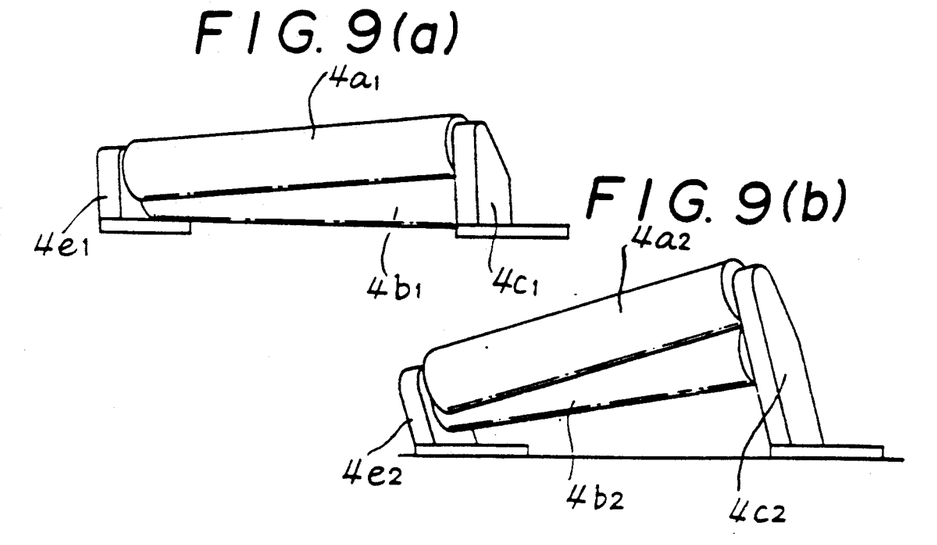
Figure 10:
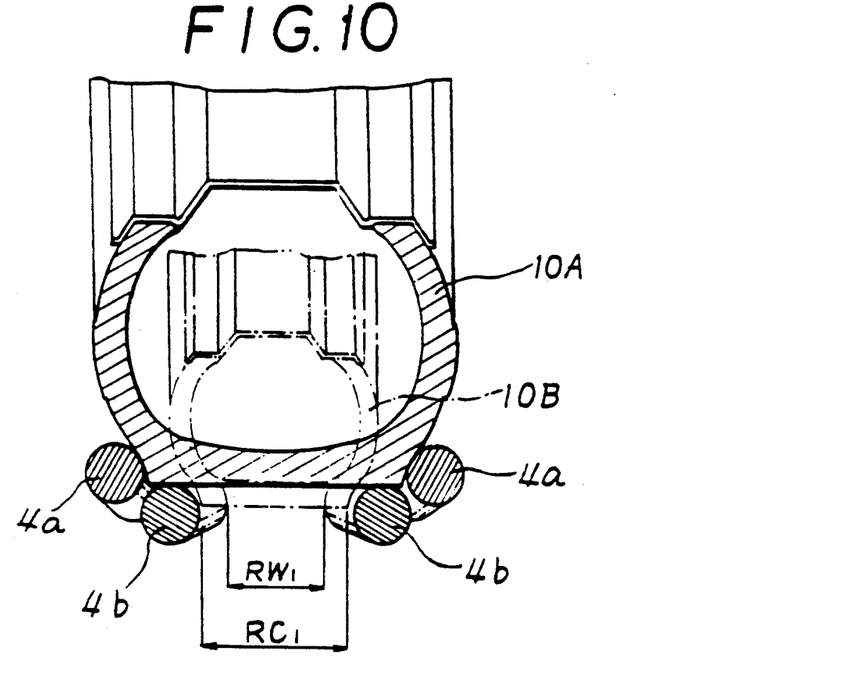
FIG. 10 is a cross sectional view taken along line 10—10'.

Therefore a preferred feature of the present invention is that, as shown in FIGS. 8 to 10, a plurality of pairs of spaced, forwardly converging rollers 4a, 4b are placed along the tire approach direction L and arranged stepwise upward. In particular the interval of the rollers 4a, 4b at least near the outlet is successively increased toward the upper rollers 4a.

The rollers 4a, 4b may be set two-stepwise as shown by an embodiment given later and also may be set three-stepwise.

According to the invention, as shown in FIG. 10, when the tire 10B for small vehicles enters the rollers, the guide and control is effected by the lower rollers 4b with the side surfaces restricted, and when the tire 10A for large vehicles has come in, while the tires are being mounted onto the lower rollers 4b, the guide and control is effected by the upper roller 4a with the side surfaces restricted, so that when the diameter of the rollers 4a, 4b is made smaller, smooth control can be made.

In this case, since the upper rollers 4a near the outlet which can effect the side surface restriction are spread wider than the lower rollers 4b and themselves have a small diameter, there is no danger that the roller circumferential surfaces will be pressed against the weakest parts of the side surfaces of the tires 10A, or are abutted against the wheels, etc. with either a small vehicle or a large vehicle. As a result, the tire side wall surface 10A will not be scarred or damaged, and the rollers are pressed against the inclined surfaces near the bottom surfaces of the tires 10A, 10B, so that precise measurement becomes possible.

By slanting at least the upper rollers 4a downward gradually toward the outlet side from the inlet side in the tire approach direction L, the impact when the tire leaves the rollers 4a, 4b is minimized, the tires can be introduced precisely to the tire setting positions of the test base, and the tires 10A, 10B can move backwards easily.

Therefore, according to the invention, various tires for small vehicles and large vehicles can be guided and controlled easily and precisely to the center positions of the rollers without increasing the diameter of the rollers, and as a result, scarring or damage to the tire side surfaces can be prevented.

Figure 7:
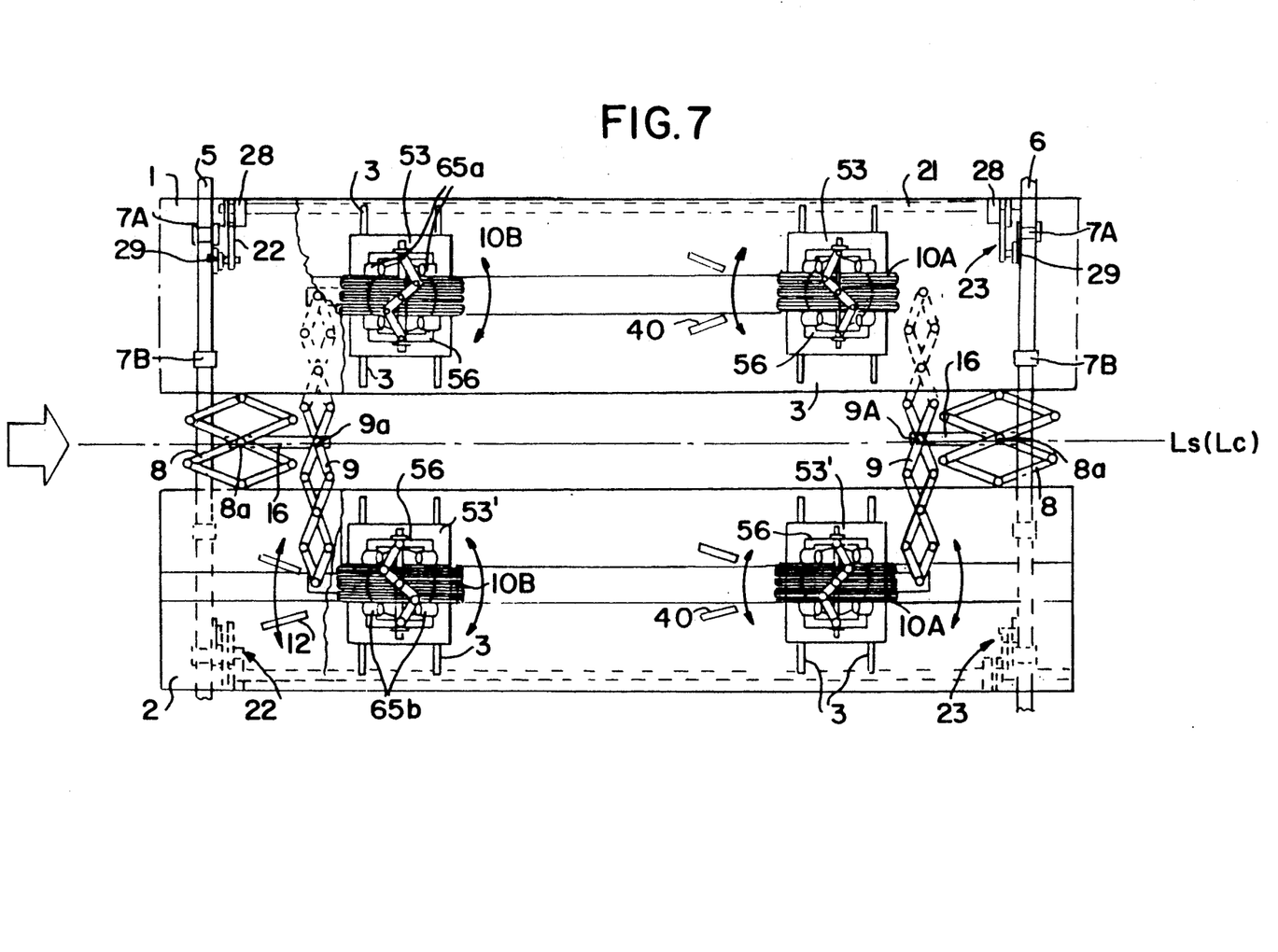
FIG. 7 is a whole plan view thereof.

As shown in FIG. 7, after the tires 10A are placed on the pairs of active juxtaposed rollers 61, 62 juxtaposed orthogonally to the direction of the advance of a vehicle by the tire guide 4 of the invention, while a prescribed rotating force is transmitted to the tires 10A by driving and rotating through the active rollers 61, 62, the side wall surfaces of the tires 10A are clamped by using the positioning rollers 65a to 65b, FIG. 7 thereby for example various data obtained by using the tires 10A as means to be detected that include the displacement of the support shaft 64 which is rotated and displaced are detected, and various positional displacements of the tires 10A including the toe, camber, caster, king pin angle, etc. that improve the maneuvering stability of a vehicle, and the alignment measurement that will be effected with the vehicle center line between the tires 10A used as reference are carried out in conventional fashion.

Therefore, it is required that the active juxtaposed rollers 61, 62 used for the test apparatus rotate to give a rotational force to the placed tire 10A, and is provided with a lock means, and while the lock means prevents the juxtaposed rollers from rotating idly, the active juxtaposed rollers 61, 62 allow, for example, the tire 10A placed on the rollers to be removed by rolling off.

As such a lock means, a device is suggested which is constituted in such a manner that gears are concentrically fixed to lateral ends of the rollers, and a pair of lock members having meshing sections capable of meshing with the gears are provided and arranged in positions where the lock members can face the gears on the lateral of the side ends of the rollers, and can integrally be reciprocated parallel to the axes of the rollers by a reciprocating means including a fluid cylinder, etc. so that the lock members and the gears may be meshed at the time of the forward movement or the backward movement to effect locking, and the reverse action may allow unlocking.

However, it is not only very difficult to cause the lock members to engage smoothly with the rotating gears while moving the lock members orthogonally to the rotational direction of the gears, it is also difficult to cause the lock members to lock due to the phase shift of the gears attached to the pair of lock members.

That is, since the rollers are not necessarily rotated synchronously, and the gears attached to the rollers may include assembling errors it is rare that the gears are rotated with the phases registered when the rollers are rotated, and generally the gears are rotated with the phases shifted.

On the other hand, although the lock members can integrally be reciprocated by a reciprocating means, in other words, the locking and unlocking can be simultaneously carried out, in the case of a pair of gears whose phases are shifted, even if one side is locked, it is impossible to lock the other side at the same time.

Therefore it is considered to provide such reciprocating means individually, but it is difficult as mentioned above to cause the lock members to engage smoothly with the rotating gears while moving the lock members orthogonally to the rotational direction of the gears, so that not only can the locking not be effected smoothly, but also, for example, the tooth surfaces tend to be damaged or dragged by the impact or the like produced at the locking. In addition, since the juxtaposed rollers are arranged in a limited space underneath the tire, it is very difficult to provide several reciprocating means for the lock members respectively because the space is limited.

Figure 12:
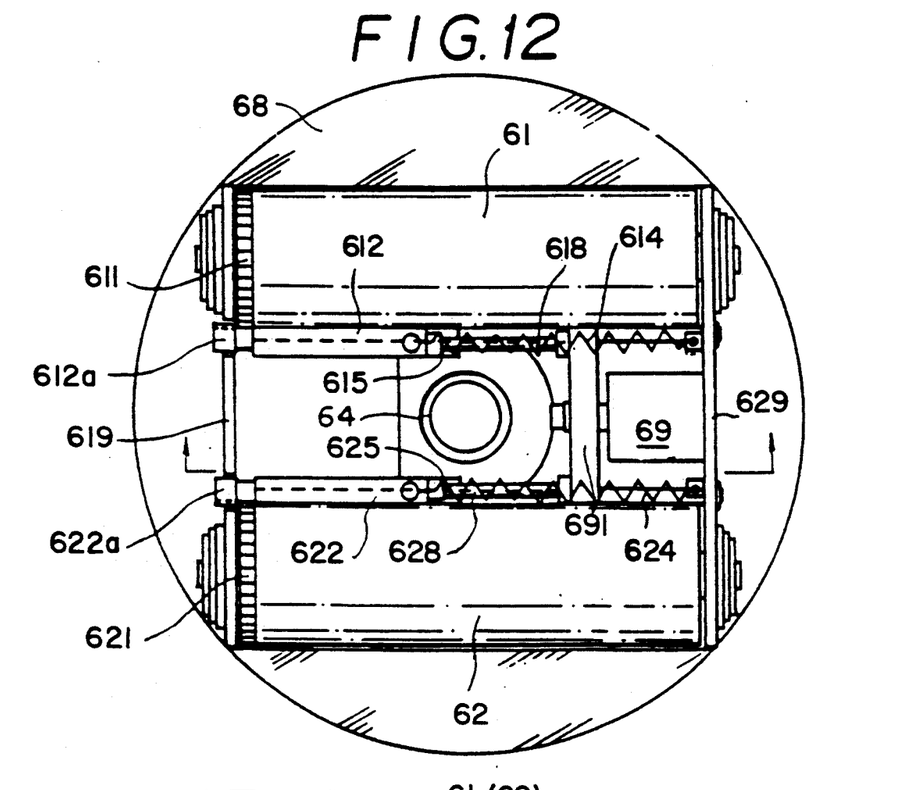
FIG. 12 is a plan view thereof.
Figure 13A:
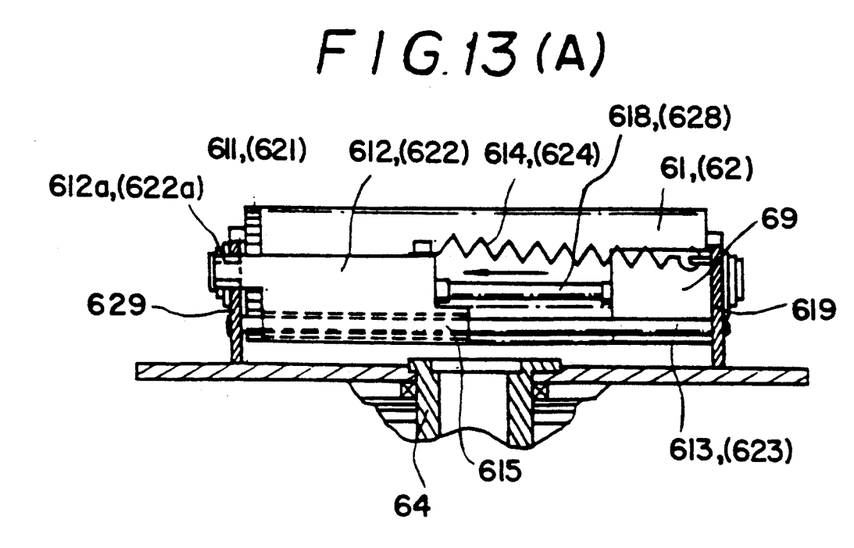
Figure 13B:
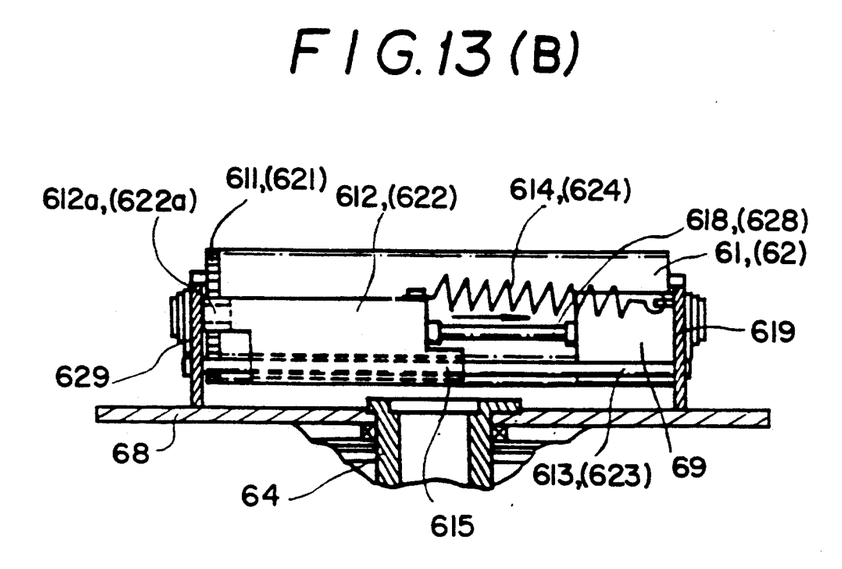
Figure 14:
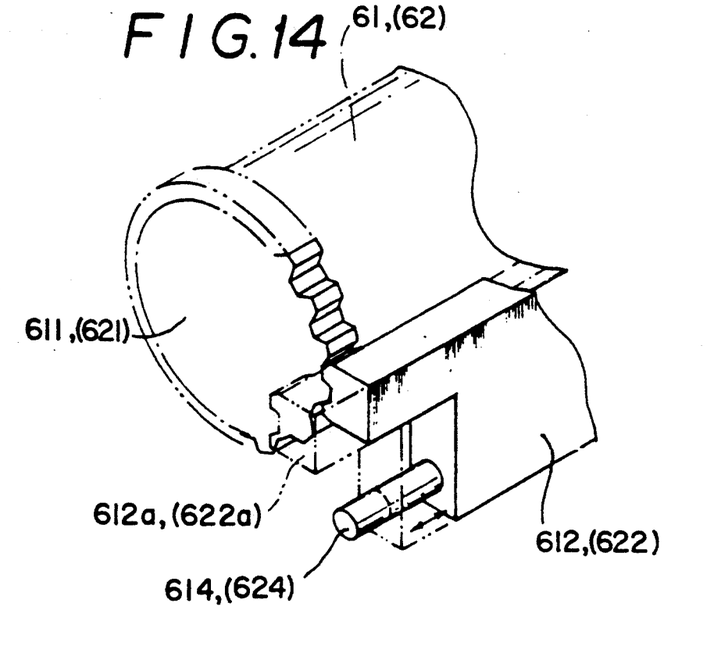
FIG. 14 is a perspective view of essential parts, showing the configuration of the lock mechanism thereof.

Therefore, a preferred feature of the present invention is that, as shown in FIGS. 12 to 14, in a lock mechanism for a pair of active juxtaposed rollers 61, 62 wherein a pair of lock members 612, 622 engageable with gears 611, 621 concentrically fixed respectively to the active juxtaposed rollers 61, 62 can be reciprocated along the roller axes by guide means 613, 623, when the lock is released the lock members 612, 622 are moved to disengage from the gears 611, 621, whereas when the locking is effected the locking is not necessarily simultaneous since the phases of the gears 611, 621 fixed respectively to the rollers 61, 62 are different, and energizing means 614, 624, preferably resilient members, connected respectively to the lock members 612, 622 are used to effect locking independently with respect to each other.

If the rollers 61, 62 effect the locking by independent energizing forces, it is very difficult to throw engaging members 612a, 622a of the lock members 612, 622 into the rotating tooth surfaces.

Therefore, a further feature of the invention lies in that even when, in the case, at the time of locking, while the lock members 612, 622 and the gears 611, 621 are being allowed to engage imperfectly, the lock members 612, 622 and the gears 611, 621 are engaged imperfectly by the energizing forces of the retracting means 614, 624, the rollers 61, 62 can be rotated through a desired angle against the energizing forces of the retracting means 614, 624.

As a result, the lock members 612, 622 and the gears 611, 621 can be engaged smoothly by the slight idle rotation of the rollers 61, 62 when the tires are removed or due to inertia as the rollers 61, 62 stop rotating.

The engagement of lock member 612 with gear 611 to lock roller 61 can be effected separately from the engagement of lock member 622 with gear 621 to lock the other roller 62 and with a time-lag even when the phases of the gears 611, 621 are different since the lock members 612, 622 are pulled back individually by the respective energizing members 614, 624.

The energizing means 614, 624 are not limited necessarily to resilient members, and air cylinders 69 whose pressure is weakened can be used therefor if the rollers 61, 62 can be rotated through a desired angle against the energizing forces of the energizing means 614, 624.

When once the lock members and the gears 611, 621 are locked, since unlocking has to be carried out against the force of the resilient members 614, 624, it is preferable to use a fluid cylinder. In the latter case, by constituting the stroke of the fluid cylinder 69 such that the engaging members 612a, 622a of the lock members are extended outside of the gears 611, 621 provided at the ends of the rollers 61, 62, it is preferable to design the locking mechanism in such a way that the engaging sections 612a, 622a of the lock members initially contact the circumferential surfaces of the gears 611, 621 by the energizing forces of the resilient members 614, 624 at the time of locking, and are pressed there against only to such an extent that the rollers 61, 62 can still rotate, and the engaging sections 612a, 622a of the lock members are moved to the engaging positions, where they will be engaged with the tooth surfaces of the gears 611, 621, by the slight rotational displacement of the rollers 61, 62 and are engaged.

Consequently, according to the invention, even if the gears mounted concentrically on the ends of the rollers are rotated with their phases shifted, the locking can easily be effected positively, and since it is sufficient if the lock means comprises a resilient member capable of abutting against the gear circumferential surface, there is no danger that at the time of locking, for example, that the tooth surface will be damaged.

Since the lock/release mechanism of the present invention may be composed of only a fluid cylinder, a pair of resilient members, etc., it can be arranged in a limited space between the pair of rollers that apply a rotational force to the tire.

PREFERRED EMBODIMENTS

Now, suitable embodiments of the present invention will be described illustratively in detail with reference to the drawings. The size, the material, the shape, the relative arrangement, etc. of the constituent parts described for the embodiments, unless otherwise specified, are not intended to limit the scope of the invention to them only, and are just illustrative examples.

FIGS. 1 to 3 show a vehicle composite test apparatus of an embodiment of the present first invention. First, the overall constitution will briefly be described with reference to FIG. Two parallel fixed beams 5, 6 are arranged orthogonally to the direction in which a vehicle will come in, that is, across the width of the vehicle, and are spaced apart from each other, and long moving platforms 1, 2 are movably disposed on the beams 5, 6 and can be moved in parallel via a plurality of rollers 7A and 7B.

The moving platforms 1, 2 are arranged on the opposite sides of the measurement reference line Ls, cover bodies 12 to which vehicle incoming paths and guide roller pairs 4, 11 that will be described later are attached are mounted on the moving platforms 1, 2. Predetermined parts of the cover bodies 12, the distance between them corresponding to wheel bases, are cut to form rectangular recesses, and a pair of rails 13 are extended through the rectangular recesses in the direction of the width of the vehicle. Test units 50, including the above-mentioned support bases 53, 53 are arranged on the rails 13 to be movable in the direction of the width of the vehicle.

The moving platforms 1, 2 are connected through a pair of pantographs 8, 8' that can be extended from or retracted to the supporting shafts 8a positioned on the measurement reference line Ls so that the moving platforms 1, 2 can be moved in reference to the supporting shafts 8a in the direction of the width of the vehicle by the extension or retraction of the pantographs 8, 8'.

Each of the above-mentioned test units 50 is constituted in such a manner that a drive roller pair 60, the above-mentioned positioning means 56, a camber sensing roller 63, etc. that will be used for carrying out basic tests about the braking, speed, etc. with the tire 10 mounted in known manner, are arranged on the support base 53 (53'). The support bases 53, 53' for the front wheels 10A, and the support bases 53, 53' for the rear wheels 10B are connected through pantographs 9, 9', respectively, and each of supporting shafts 9a of the pantographs 9, 9' and each of the supporting shafts 8a of the pantographs 8, 8' connecting the moving platforms 1, 2 are connected by means of respective supporting rods 16 in such a manner that both the supporting points 8a, 9a of the pantographs 8, 8', 9, 9' are positioned on the measurement reference line Ls.

If the supporting shafts 8a, 9a are positioned on the measurement reference line Ls, the pantographs 8, 8', 9, 9' may be pivotally supported on beams 15 that serve as their fixing means and are fixed to the bottom of the apparatus body as shown in FIG. 2. Alternatively the pantograph mechanisms may be supported on the floating supporting points 8a, 9a, as shown in FIGS. 1 and 3.

It is preferable that each of the mechanisms of the pantographs 9, 9' connecting the support bases 53, 53' and each of the mechanisms of the pantographs 8, 8' connecting the moving platforms 1, 2 share the supporting point 8a (9a), and, for that purpose for example as shown in FIGS. 1, 3 and 7, the pantograph 8 and the pantograph 9 may comprise a double pantograph mechanism 20 wherein the supporting points 8a, 9a are registered by a shaft 16.

In this way, the moving platforms 1, 2 can be positively moved in parallel toward or away from the supporting points 8a, 9a, and therefore the alignment and toe measurement by the pantographs 9, 9' which connect the support bases 53, 53' can be carried out very precisely.

Each of the cover bodies 12 carries a primary guide roller pair 11 on the inlet side in which the rollers are arranged with their forward ends converged. Secondary guide roller pairs 4 are arranged on the inlet side of each support base with the forward ends converging and with the space between them being set smaller than that between primary guide rollers 11 so that the side surfaces of the tires 10 can ride on them. In order to facilitate good guidance and control, the secondary guide roller pairs 4 comprise guide roller pairs 4a, 4b arranged one above the other with their forward ends directed downward.

According to the above embodiment, after the tires 10 of a vehicle moving along the approach paths on said moving platforms 1, 2 are first guided toward the centers of the approach paths with rough precision by the primary guide roller pairs 11, then while the tires 10 are moved along the inner circumferential surfaces of the secondary guide roller pairs 4a, 4b by the forward motion of the vehicle thereby controlling the positions, the moving platforms 1, 2 are precisely moved symmetrically toward or away from the measurement reference line Ls with the moving platforms 1, 2 maintained parallel so that the distance between them may correspond to the width of the vehicle, and then all the left and right wheels 10 are positioned in place on the drive roller pairs of the test units 50. Thereafter, since by clamping the front wheels 10 by the positioning means 56, the support bases 53, 53' on the sides of the front wheels 10A and the rear wheels 10B are moved toward or away from the supporting point 9a on the measurement reference line Ls by the pantographs 9, 9', for example any error of the attached positions of the front wheels 10A and the rear wheels 10B is compensated for to allow various test items to be measured precisely.

FIGS. 5 to 7 show a parallel moving mechanism for moving platforms of a second embodiment. The long moving platforms 1, 2 can travel via a plurality of rollers 7A, 7B, on two fixed beams 5, 6 that are positioned at opposite ends of the length of the arrangement and are parallel to the width of the vehicle. Of the rollers 7A, 7B, the rollers 7A comprise flanged guide rollers to effect the guide and control.

The moving platforms 1, 2 are provided with side frames 26 on the outer longitudinal sides between the beams 5, 6. Horizontal fixed plates 28 each having a bearing 27 fixed on the undersurface are fixed the beams 5, 6 on the inner walls of the side frames 26 adjacent the beams 5, 6.

Brackets 29 are attached to the beams 5, 6 at prescribed sections on their facing side surfaces, and one end of each of link mechanisms 22, 23 that will be described later is pivotally supported on respective shafts 29a which project from the brackets 29.

Each of the link mechanisms 22, 23 comprises a pair of arms 24, 25 having ends which are pivotally connected together, so that the respective link mechanisms 22, 23 can be folded or extended in planes that are parallel to the side walls of the beams 5, 6. The other ends of arms 25 are fixed to shaft ends of operation transferring shafts 21 that will be described later.

The operation transferring shafts 21 extend linearly along the length of the moving platforms 1, 2 between the opposed beams 5, 6, and the front and rear ends of the operation transferring shafts 21 are pivotally supported in bearings 27 on the sides of the moving platforms 1, 2.

The operation of the above embodiment was described in detail in the section describing the operation of the above second embodiment, and therefore the description thereof is not repeated.

FIGS. 8 to 10 show a guide apparatus for a preferred embodiment of the invention. This apparatus comprises two pairs of roller shafts 4a, 4b which have the same diameter and the same length, and are arranged with their forward ends converging along the advance direction L. Rollers 4a and 4b are rotatably supported on pairs of brackets 4c, 4e which extend vertically from bases 4d.

The minimum spacing between the side surfaces of $FW_1$ of the lower roller pair 4b, on their inlet side is set wider than the maximum tire width $W_1$, and the spacing between the rollers 4b and the shaft diameter thereof are selected such that the minimum tire width $W_2$ which will enter the guide apparatus is between the minimum spacing of the side surfaces $RW_1$ and the access spacing $RC_1$ of the lower roller pair 4b near the outlet side of the guide rollers.

Although the angles of the lower rollers 4b in the direction of advance of a vehicle are approximately symmetrical with respect to the transverse direction, the angles of the rollers 4b in the direction of advance of a vehicle are not necessarily symmetrical with respect to the vertical direction. For example as shown in FIG. 9 (a) and 9 (b), the outboard roller shaft $4b_2$ is inclined downward in the tire advance direction L from the inlet side toward the outlet side while the inboard roller shaft $4b_1$ extends approximately horizontally.

On the other hand, the spacing between the upper rollers 4a is set wider than that of the lower rollers 4b with their forward ends converging, and the interval is not necessarily uniform relative to the lower rollers 4b, and is set to differ more at the outlet than at the inlet side.

That is, since on the inlet side the spacing $FW_1$ between side surfaces of the lower rollers 4b is wider than the maximum tire width $W_1$, if the spacing between the upper rollers 4a is the same as that, there are no troubles for the advance of tires 10A, 10B. But since at the outlet side the guide and control is effected based on the spacing between the rollers 4a, 4b, by increasing the spacing between the upper rollers 4a at the outlet side to a certain extent under a prescribed limitation, the types of the tires 2A, 2B that can be guided and controlled can be increased.

Therefore, in this embodiment, the access spacing $RC_2$ of the upper rollers 4a at the outlet side is approximately equal to or wider than the maximum tire width $W_1$, and the spacing $RW_2$ between the side surface is smaller than the maximum tire width $W_1$.

The upper rollers 4a are inclined downward in the tire advance direction L from the inlet side toward the outlet side and are supported on the brackets 4c, 4e.

This guide roller arrangement facilitates smooth operation of the present invention.

FIGS. 12 to 14 show an active juxtaposed roller pair of an embodiment of the invention.

In FIG. 12, reference numeral 68 indicates a disk-like base plate rotatable on a support shaft 64, a pair of upright support plates 619, 629 are arranged in parallel on the left and right sides of the base plate 68, and a pair of rollers 61, 62 are pivotally supported between the support plates 619, 629.

The rollers 61, 62 are arranged in parallel with one behind the other and symmetrically with support shaft 64 which is disposed between them. Spur gears 611, 621 having a diameter equal to or a little larger than the diameter of the rollers 61, 62 are fixed concentrically at one end of the rollers 61, 62.

An air cylinder 69 mounted approximately at the central position of one of the support plates 619, 629 is arranged in the central space between the rollers 61, 62, and a pair of cylinder pistons 618, 628 extending axially of the rollers 61, 62 along and near the rollers 61, 62 are connected through a bar 691 extending normally to the cylinder 69. A pair of lock members 612, 622 having meshing sections 611a, 621a projecting therefrom and meshable with the gears 611, 621 are provided on the forward ends of the pistons.

A pair of guide shafts 613, 623 on which the lock members 612, 622 can be slid in controlled fashion relative to the rollers 61, 62, are extended through the lower portions of the lock members 612, 622, and the opposite ends of the guide shafts 613, 623 are fixed to the support plates 619, 629.

The air cylinder 69 may be a single-acting type air cylinder 69 that can be moved forward in the direction shown by the in FIG. 13(A) by the application of pressure, and can be moved backward in the direction shown by the arrow in FIG. 13(B) only by an external force when the air pressure is released and when the lock members 612, 622 are freed.

Coil springs 614, 624 are connected between the lock members 612, 622 and the support members in such a way that when the air is released from cylinder 69, the lock members 612, 622 may be pulled back. Reference numerals 615, 625 indicate stoppers for restricting the backward stroke of the lock members 612, 622.

The manner of operation of this embodiment will now be described. First, when the air cylinder 69 is driven to move the lock members 612, 622 forward against the resiliency of the coil springs 614, 624, which engage sections 612a, 622a of the lock members engaging with the gears 611, 621 are extended to a position outside of the gears 611, 621, thereby releasing the lock. With this state maintained, the rollers 61, 62 can be rotated, and tests of vehicles including a check of the wheel alignment can be carried out in conventional manner.

When it is required to remove a vehicle from the test apparatus after vehicle tests, the supply of electricity to the motor providing a driving force for the rollers 61, 62 is stopped, the pressure in the air cylinder 69 is released, and then engaging sections 612a, 622a of the lock members are pulled into contact with the circumferential surfaces of the gears 611, 621 and are engaged imperfectly therewith by the energized force of the resilient members 614, 624 at the time of the locking operation. By the inertia force of the rollers 61, 62, or the slight idle rotation of the rollers 61, 62 when a tire 10 is removed, the gears 611, 621, whose phases are different, are engaged with the lock members 612, 622 respectively thereby enabling perfect locking of the rollers 61, 62.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A lock mechanism for a pair of active juxtaposed rollers provided in a vehicle test apparatus for receiving a wheel of a vehicle to be tested, said lock mechanism comprising a first lock member engageable with a first gear concentrically fixed to one of the active juxtaposed rollers, and a second lock member engageable with a second gear concentrically fixed to the other of the active juxtaposed rollers, said first and second lock members each being reciprocally movable between respective unlocked and locked positions along guide means parallel to the axes of said rollers, wherein each of said first and second lock members is provided with an independent, resilient actuating means for independently urging the respective lock member toward its locked position to lock said roller against rotation, and wherein said first and second lock members are further provided with a single common actuator means which when actuated positively moves said lock members against the force of said resilient actuating means from their locked positions to their unlocked positions, whereby if either lock member and its respective gear are not aligned for interengagement when said actuator means is deactuated to allow said resilient actuating means to move said lock members to their locked positions, the respective roller continues to rotate against the force of said resilient actuating means until said lock member and said gear are aligned for interengagement, and the force of said resilient actuating means causes the respective lock member and gear to engage and lock said roller against rotation.

2. The lock mechanism according to claim 1, wherein said single common actuator means comprises a single-acting type air cylinder which when actuated moves said first and second lock members against the force of said resilient actuating means to extended positions in which said lock members are disengaged from the gears.

3. A lock mechanism according to claim 1, wherein said resilient actuating means comprise a first tension spring for urging said first lock member toward its locked position and a second tension spring for urging said second lock member toward its locked position.

* * * * *